(12) United States Patent
Ait Aoudia et al.

(10) Patent No.: US 11,082,264 B2
(45) Date of Patent: Aug. 3, 2021

(54) LEARNING IN COMMUNICATION SYSTEMS

(71) Applicant: Nokia Technologies OY, Espoo (FI)

(72) Inventors: Faycal Ait Aoudia, Saint-Cloud (FR); Jakob Hoydis, Paris (FR)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/044,553

(22) PCT Filed: Jun. 29, 2018

(86) PCT No.: PCT/IB2018/001029
§ 371 (c)(1),
(2) Date: Oct. 1, 2020

(87) PCT Pub. No.: WO2019/193380
PCT Pub. Date: Oct. 10, 2019

(65) Prior Publication Data
US 2021/0099327 A1 Apr. 1, 2021

(30) Foreign Application Priority Data

Apr. 3, 2018 (WO) .................. PCT/IB2018/000814

(51) Int. Cl.
*H04L 25/02* (2006.01)
*G06N 3/04* (2006.01)
(Continued)

(52) U.S. Cl.
CPC ....... *H04L 25/0204* (2013.01); *G06N 3/0454* (2013.01); *H04L 1/0041* (2013.01);
(Continued)

(58) Field of Classification Search
CPC ................ G06N 3/0454; G06N 3/0445; H04L 25/0204; H04L 1/0041; H04L 1/0045;
(Continued)

(56) References Cited

U.S. PATENT DOCUMENTS

| | | | |
|---|---|---|---|
| 5,293,453 A | 3/1994 | Frazier | |
| 2004/0135723 A1* | 7/2004 | Nakaya | H04B 7/0874 342/372 |

(Continued)

OTHER PUBLICATIONS

International Search Report PCT/ISA/210 for International Application No. PCT/IB2018/001029 dated Jan. 7, 2019.

*Primary Examiner* — Sung S Ahn
(74) *Attorney, Agent, or Firm* — Harness, Dickey & Pierce, P.L.C.

(57) ABSTRACT

A method, apparatus and computer program are described includes obtaining or generating a transmitter-training sequence of messages for a first transmitter of a first module of a transmission system, wherein the transmission system includes the first module having the first transmitter and a first receiver, a second module having a second transmitter and a second receiver, and a channel, wherein the first transmitter includes a transmitter algorithm having at least some trainable weights; transmitting a perturbed version of the transmitter-training sequence of messages from the first transmitter to the second receiver over the channel of the transmission system; receiving a first loss function at the first receiver from the second transmitter, wherein the first loss function is based on the transmitted perturbed versions of the transmitter-training sequence of messages as received at the second receiver and knowledge of the transmitter-training sequence of messages for the first transmitter of the transmission system; and training at least some weights of the transmitter algorithm of the first transmitter based on the first loss function.

19 Claims, 6 Drawing Sheets

(51) Int. Cl.
  *H04L 1/00* (2006.01)
  *H04L 25/03* (2006.01)
(52) U.S. Cl.
  CPC ........ *H04L 1/0045* (2013.01); *H04L 25/0226* (2013.01); *H04L 25/03343* (2013.01)
(58) Field of Classification Search
  CPC ........... H04L 25/0226; H04L 25/03343; H04L 25/03019
  See application file for complete search history.

(56) References Cited

U.S. PATENT DOCUMENTS

| | | | | |
|---|---|---|---|---|
| 2005/0068886 | A1* | 3/2005 | Wang | H04L 27/2607 370/210 |
| 2011/0149929 | A1* | 6/2011 | Kleider | H04L 27/2613 370/338 |
| 2018/0046912 | A1* | 2/2018 | Kurata | G06N 3/0454 |

* cited by examiner

LEARNING IN COMMUNICATION SYSTEMS

CROSS-REFERENCE TO RELATED APPLICATIONS

This application is a national phase under 35 U.S.C. § 371 of PCT International Application No. PCT/IB2018/001029 which has an International filing date of Jun. 29, 2018, which claims priority to World Intellectual Patent Office Application No. PCT/IB2018/000814, filed Apr. 3, 2018, the entire contents of each of which are hereby incorporated by reference.

FIELD

The present specification relates to learning in communication systems.

BACKGROUND

A simple communications system includes a transmitter, a transmission channel, and a receiver. The design of such communications systems may involve the separate design and optimisation of each part of the system. An alternative approach is to consider the entire communication system as a single system and to seek to optimise the entire system. Although some attempts have been made in the prior art, there remains scope for further developments in this area.

SUMMARY

In a first aspect, this specification describes an apparatus comprising: means for receiving a first receiver-training sequence of messages at a first receiver of a first module of a transmission system from a second transmitter over a channel, wherein the transmission system comprises the first module having a first transmitter and the first receiver, a second module having the second transmitter and a second receiver, and the channel, wherein the first transmitter includes a first transmitter algorithm having at least some trainable weights, the second transmitter includes a second transmitter algorithm having at least some trainable weights, the first receiver has a first receiver algorithm having at least some trainable weights, and the second receiver includes a second receiver algorithm having at least some trainable weights; means for obtaining or generating a first receiver loss function, the first receiver loss function being generated based on the first receiver-training sequence as received at the first receiver and knowledge of the first receiver-training sequence as transmitted by the second transmitter; means for training at least some weights of the first receiver training algorithm based on the first receiver loss function; means for transmitting a second receiver-training sequence of messages from the first transmitter to the second receiver over the channel to enable at least some weights of the second receiver algorithm to be trained on the basis of a second receiver loss function generated based on the second receiver-training sequence as received at the second receiver and knowledge of the second receiver-training sequence as transmitted by the first transmitter; means for transmitting a perturbed version of a first transmitter-training sequence of messages from the first transmitter to the second receiver over the channel; means for receiving a first transmitter loss function at the first receiver as sent from the second transmitter over the channel, wherein the first transmitter loss function is based on the transmitted perturbed versions of the first transmitter-training sequence of messages as received at the second receiver and knowledge of the first transmitter-training sequence of messages; and means for training at least some weights of the transmitter algorithm of the first transmitter based on the first transmitter loss function. The first and/or the second receiver algorithm may comprise a receiver neural network. The first and/or the second transmitter algorithm may comprise a transmitter neural network.

Some embodiments include means for generating the perturbed version of the first transmitter-training sequence of messages at the first module of the transmission system.

The perturbations may be zero-mean Gaussian perturbations.

The first transmitter loss function may be generated at the second module.

The first transmitter loss function may be based on a mean-squared error between the first transmitter-training sequence of messages and the perturbed version of the first transmitter-training sequence of messages.

Some embodiments include means for repeating the training of the at least some weights of the first transmitter algorithm of the first transmitter until a first condition is reached. The first condition may, for example, be a defined number of iterations and/or a defined performance level.

In some embodiments, the means for training at least some weights of the first transmitter may further comprise optimising one or more of a batch size of the first transmitter-training sequence of messages, a learning rate, and a distribution of the perturbations applied to the perturbed versions of the first transmitter-training sequence of messages.

Some embodiments include means for repeating the training of the at least some weights of the first receiver algorithm until a second condition is reached. The second condition may be a defined number of iterations and/or a defined performance level.

The first receiver loss function may be based on a mean-squared error between the first receiver-training sequence of messages as transmitted by the second transmitter and the first receiver-training sequence of messages as received at the first receiver.

Some embodiments include means for repeating both the training of the at least some weights of the first transmitter algorithm and repeating the training of the at least some weights of the first receiver algorithm until a third condition is reached.

Some embodiments include: means for receiving a perturbed version of a second transmitter-training sequence of messages for the second transmitter at the first receiver; and means for generating a second loss function, wherein the second loss function is based on the received perturbed version of the second transmitter-training sequence of messages as received at the first receiver and knowledge of the second transmitter-training sequence of messages for the second transmitter of the transmission system. Furthermore, some embodiments include means for sending the second loss function from the first transmitter to the second receiver.

Some embodiments include: means for receiving the perturbed version of the first transmitter-training sequence of messages for the first transmitter at the second receiver; means for generating the first transmitter loss function; and means for sending the first transmitter loss function from the second transmitter to the first receiver.

The said means may comprise: at least one processor; and at least one memory including computer program code, the at least one memory and computer program code configured to, with the at least one processor, cause the performance of the apparatus.

In a second aspect, this specification describes a method comprising: receiving a first receiver-training sequence of messages at a first receiver of a first module of a transmission system from a second transmitter over a channel, wherein the transmission system comprises the first module having a first transmitter and the first receiver, a second module having the second transmitter and a second receiver, and the channel, wherein the first transmitter includes a first transmitter algorithm having at least some trainable weights, the second transmitter includes a second transmitter algorithm having at least some trainable weights, the first receiver has a first receiver algorithm having at least some trainable weights, and the second receiver includes a second receiver algorithm having at least some trainable weights; obtaining or generating a first receiver loss function, the first receiver loss function being generated based on the first receiver-training sequence as received at the first receiver and knowledge of the first receiver-training sequence as transmitted by the second transmitter; training at least some weights of the first receiver training algorithm based on the first receiver loss function; transmitting a second receiver-training sequence of messages from the first transmitter to the second receiver over the channel to enable at least some weights of the second receiver algorithm to be trained on the basis of a second receiver loss function generated based on the second receiver-training sequence as received at the second receiver and knowledge of the second receiver-training sequence as transmitted by the first transmitter; transmitting a perturbed version of a first transmitter-training sequence of messages from the first transmitter to the second receiver over the channel; receiving a first transmitter loss function at the first receiver as sent from the second transmitter over the channel, wherein the first transmitter loss function is based on the transmitted perturbed versions of the first transmitter-training sequence of messages as received at the second receiver and knowledge of the first transmitter-training sequence of messages; and training at least some weights of the transmitter algorithm of the first transmitter based on the first transmitter loss function. The first and/or the second receiver algorithm may comprise a receiver neural network. The first and/or the second transmitter algorithm may comprise a transmitter neural network.

The perturbed version of the first transmitter-training sequence of messages may be generated at the first module of the transmission system.

The first transmitter loss function may be generated at the second module.

The first transmitter loss function may be based on a mean-squared error between the first transmitter-training sequence of messages and the perturbed version of the first transmitter-training sequence of messages.

Some embodiments include repeating the training of the at least some weights of the first transmitter algorithm of the first transmitter until a first condition is reached. The first condition may, for example, be a defined number of iterations and/or a defined performance level. Some embodiments include repeating the training of the at least some weights of the first receiver algorithm until a second condition is reached. The second condition may be a defined number of iterations and/or a defined performance level. Some embodiments include means for repeating both the training of the at least some weights of the first transmitter algorithm and repeating the training of the at least some weights of the first receiver algorithm until a third condition is reached.

Some embodiments include: receiving a perturbed version of a second transmitter-training sequence of messages for the second transmitter at the first receiver; and generating a second loss function, wherein the second loss function is based on the received perturbed version of the second transmitter-training sequence of messages as received at the first receiver and knowledge of the second transmitter-training sequence of messages for the second transmitter of the transmission system. Furthermore, some embodiments include sending the second loss function from the first transmitter to the second receiver.

Some embodiments include: receiving the perturbed version of the first transmitter-training sequence of messages for the first transmitter at the second receiver; generating the first transmitter loss function; and sending the first transmitter loss function from the second transmitter to the first receiver.

In a third aspect, this specification describes an apparatus configured to perform any method as described with reference to the second aspect.

In a fourth aspect, this specification describes computer-readable instructions which, when executed by computing apparatus, cause the computing apparatus to perform any method as described with reference to the second aspect.

In a fifth aspect, this specification describes a computer program comprising instructions for causing an apparatus to perform at least the following: receive a first receiver-training sequence of messages at a first receiver of a first module of a transmission system from a second transmitter over a channel, wherein the transmission system comprises the first module having a first transmitter and the first receiver, a second module having the second transmitter and a second receiver, and the channel, wherein the first transmitter includes a first transmitter algorithm having at least some trainable weights, the second transmitter includes a second transmitter algorithm having at least some trainable weights, the first receiver has a first receiver algorithm having at least some trainable weights, and the second receiver includes a second receiver algorithm having at least some trainable weights; obtain or generate a first receiver loss function, the first receiver loss function being generated based on the first receiver-training sequence as received at the first receiver and knowledge of the first receiver-training sequence as transmitted by the second transmitter; train at least some weights of the first receiver training algorithm based on the first receiver loss function; transmit a second receiver-training sequence of messages from the first transmitter to the second receiver over the channel to enable at least some weights of the second receiver algorithm to be trained on the basis of a second receiver loss function generated based on the second receiver-training sequence as received at the second receiver and knowledge of the second receiver-training sequence as transmitted by the first transmitter; transmit a perturbed version of a first transmitter-training sequence of messages from the first transmitter to the second receiver over the channel; receive a first transmitter loss function at the first receiver as sent from the second transmitter over the channel, wherein the first transmitter loss function is based on the transmitted perturbed versions of the first transmitter-training sequence of messages as received at the second receiver and knowledge of the first transmitter-training sequence of messages; and train at least some weights of the transmitter algorithm of the first transmitter based on the first transmitter loss function.

In a sixth aspect, this specification describes a non-transitory computer-readable medium comprising program instructions stored thereon for performing at least the following: receiving a first receiver-training sequence of messages at a first receiver of a first module of a transmission system from a second transmitter over a channel, wherein the transmission system comprises the first module having a first transmitter and the first receiver, a second module having the second transmitter and a second receiver, and the channel, wherein the first transmitter includes a first transmitter algorithm having at least some trainable weights, the second transmitter includes a second transmitter algorithm having at least some trainable weights, the first receiver has a first receiver algorithm having at least some trainable weights, and the second receiver includes a second receiver algorithm having at least some trainable weights; obtaining or generating a first receiver loss function, the first receiver loss function being generated based on the first receiver-training sequence as received at the first receiver and knowledge of the first receiver-training sequence as transmitted by the second transmitter; training at least some weights of the first receiver training algorithm based on the first receiver loss function; transmitting a second receiver-training sequence of messages from the first transmitter to the second receiver over the channel to enable at least some weights of the second receiver algorithm to be trained on the basis of a second receiver loss function generated based on the second receiver-training sequence as received at the second receiver and knowledge of the second receiver-training sequence as transmitted by the first transmitter; transmitting a perturbed version of a first transmitter-training sequence of messages from the first transmitter to the second receiver over the channel; receiving a first transmitter loss function at the first receiver as sent from the second transmitter over the channel, wherein the first transmitter loss function is based on the transmitted perturbed versions of the first transmitter-training sequence of messages as received at the second receiver and knowledge of the first transmitter-training sequence of messages; and training at least some weights of the transmitter algorithm of the first transmitter based on the first transmitter loss function.

BRIEF DESCRIPTION OF THE DRAWINGS

Example embodiments will now be described, by way of non-limiting examples, with reference to the following schematic drawings, in which.

DETAILED DESCRIPTION

Figure 1:
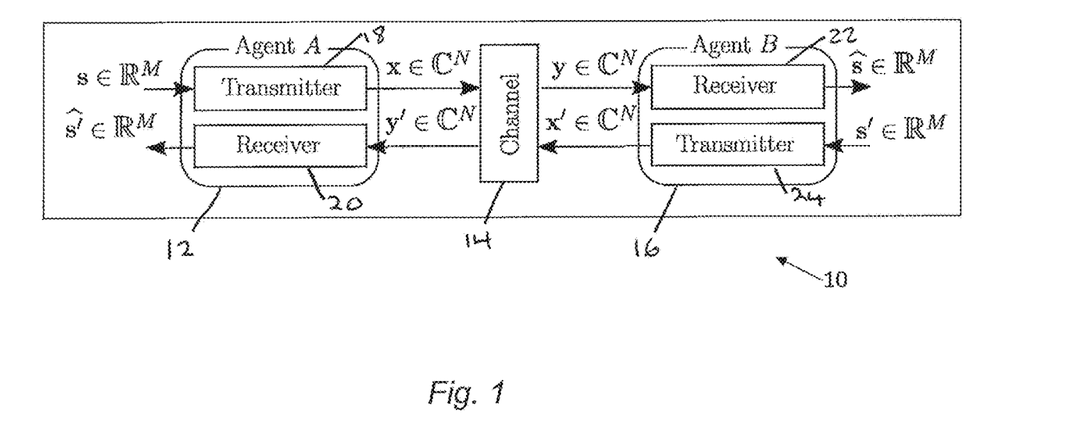
FIG. 1 is a block diagram of an example end-to-end communication system in accordance with an example embodiment.

FIG. 1 is a block diagram of an example end-to-end communication system, indicated generally by the reference numeral 10, in accordance with an example embodiment.

The system 1 includes a first agent 12, a channel 14 and a second agent 16. The first and second agents 12 and 16 are sometimes referred to herein as first and second modules.

The first agent or module 12 includes a first transmitter 18 and a first receiver 20. The second agent or module 16 includes a second receiver 22 and a second transmitter 24.

Viewed at a system level, the system 10 converts an first input symbol (s) (also called a message) at the input of the first transmitter 18 into a first output symbol (ŝ) at the output of the second receiver 22 and converts a second input symbol s' at the input to the second transmitter 24 into a second output symbol $\hat{s}'$ at the output of the first receiver 20.

As described further below, the first transmitter 18 and the second transmitter 24 include modules (such as neural networks) for implementing transmitter algorithms. Similarly, the first receiver 20 and the second receiver 22 include modules (such as neural networks) for implementing receiver algorithms. At least some of the modules may be trained in order to optimise the performance of the system 10. More specifically, one or more of the transmitter algorithms and/or one or more of the receiver algorithms may include at least some trainable weights (which may be trainable through stochastic gradient descent and/or reinforcement learning).

As described in detail below, the first transmitter 18 communicates a real-valued vector $s \in \mathbb{R}^M$ to the second receiver 22. To this end, the first transmitter 18 sends a complex-valued representation $x=x(s) \in \mathbb{C}^N$ of s through the channel 14. This representation can be seen as complex-baseband symbols. Generally, the transmitter hardware imposes constraints on x, e.g. an energy constrain $\|x\|_2^2 \leq n$, an amplitude constraint $|x_i| \leq 1$ $\forall i$, or an average power constraint $\mathbb{E}[|x_i|^2] \leq 1$ $\forall i$. The channel is described by the conditional probability density function (pdf) p(y|x), where $y \in \mathbb{R}^{iv}$ denotes the received signal. Note that, depending on the channel, the dimensions of y could be different from N. Upon reception of y, the receiver produces the estimate ŝ the transmitted real-valued vector s.

Similarly, the second transmitter 24 communicates a real-valued vector $s' \in \mathbb{R}$ to the first receiver 20. To this end, the second transmitter 24 sends a complex-valued representation $x'=x(s') \in \mathbb{C}^N$ of s through the channel 14.

The transmitters 18 and 24 define the mapping: TX: $\mathbb{R}^M \mapsto \mathbb{C}^N$. In other words, the transmitters map a real-valued vector ($s \in \mathbb{R}^M$ in the case of the transmitter 18 and $s' \in \mathbb{R}^M$ in the case of the transmitter 24) to an N-dimensional complex-valued vector. This mapping can be implemented as a neural network, as described below. Other parametric differential mappings could be provided instead of a neural network.

The receivers 20 and 22 define the mapping: RX: $\mathbb{C}^N \mapsto \mathbb{R}^M$. In other words, the receivers map a complex-valued vector ($y' \in \mathbb{C}^N$ in the case of the receiver 20 and $y \in \mathbb{C}^N$ in the case of the receiver 22) to an N-dimensional real-valued vector. This mapping can be implemented as a neural network, as described below. Other parametric differential mappings could be provided instead of a neural network.

Figure 2:
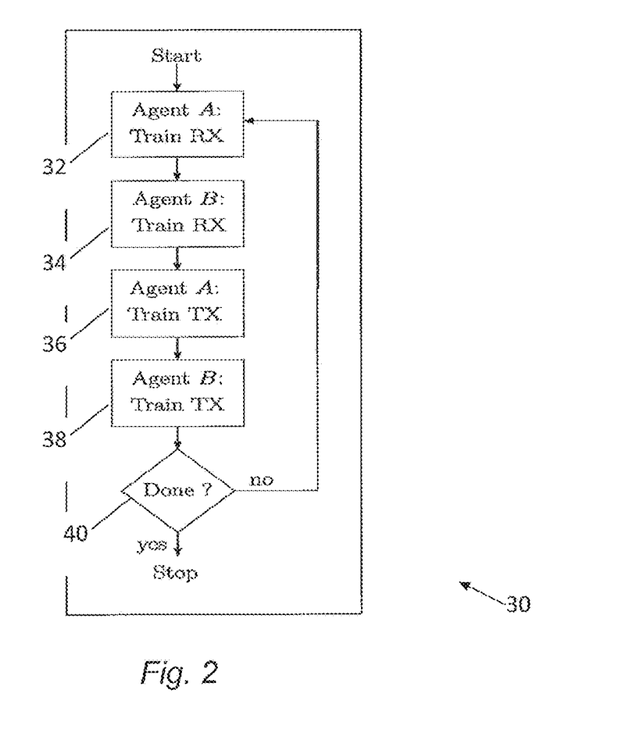
FIG. 2 is a flow chart showing an algorithm in accordance with an example embodiment.

FIG. 2 is a flow chart showing an algorithm, indicated generally by the reference numeral 30, in accordance with an example embodiment.

Following an initialisation process (not shown) in which trainable parameters of the receivers and transmitters of the system 10 an initialised (e.g. randomly, according to some chosen distribution), the algorithm 30 starts at operation 32 where the first receiver 20 of the first module 12 is trained by making the second transmitter 24 send predefined data to the first receiver 20 over the channel 14 and using supervised learning techniques to optimise the first receiver 20. Next, at operation 34, the second receiver 22 of the second module 16 is trained by making the first transmitter 18 send predefined data to the second receiver 22 over the channel 14 and using supervised learning techniques to optimise the second receiver 22.

Thus, the operations 32 and 34 represent an iteration of receiver training for both the first module 12 and the second module 16.

At operation 36 of the algorithm 30, the first transmitter 18 of the first module 12 is trained by enabling that transmitter to explore the space of possible real-valued vectors to channel symbol mappings, by introducing small perturbations (e.g. through the addition of a Gaussian zero-mean noise). The second receiver 22 provides feedback to the first transmitter in the form of a scalar loss relevant to a certain performance metric. (The feedback is sent by the second transmitter 24 over the channel 14 and received by the first receiver 20.) Using reinforcement learning, the gradient of the loss can be estimated.

Similarly, at operation 38 of the algorithm 30, the second transmitter 24 of the second module 16 is trained by enabling that transmitter to explore the space of possible real-valued vectors to channel symbol mappings, by introducing small perturbations, with the first receiver 20 providing feedback to the first transmitter (via channel 14) in the form of a scalar loss relevant to a certain performance metric. (The feedback is sent by the first transmitter 18 over the channel 14 and received by the second receiver 22.) Using reinforcement learning, the gradient of the loss can be estimated.

Thus, the operations 36 and 38 represent an iteration of transmitter training for both the first module 12 and the second module 16.

Finally, at operation 40, it is determined whether the algorithm 30 is complete. If so, the algorithm terminates. If not, the algorithm returns to operation 32. The operation 40 of the algorithm 30 may take many forms. These include stopping after a fixed number of training iterations, stopping when the error measurement has not decreased during a fixed number of iteration or stopping when the mean square error has reached a desired value.

In this way, the algorithm 30 can be used to implement multiple iterations of receiver and transmitter training for the system 10. Following the training process, the respective transmitters and receivers can communicate.

Of course, the algorithm 30 is provided by way of example and variants (including a different order of the operations described) are possible. Further details regarding the operations of the algorithm 30 are provided below.

Figure 3:
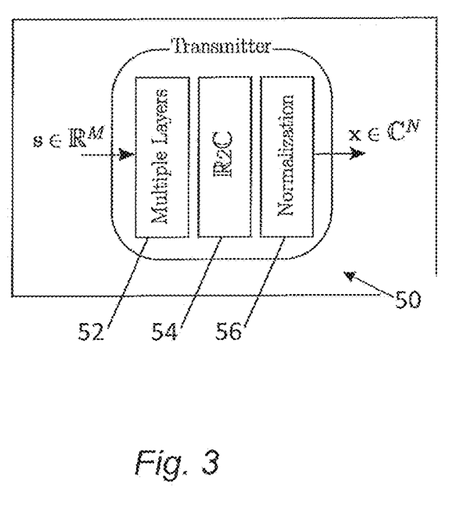
FIG. 3 is a block diagram of a transmitter used in example embodiments.

FIG. 3 is a block diagram of a transmitter, indicated generally by the reference numeral 50, used in example embodiments (such as the transmitters 18 and 24 described above). As shown in FIG. 3, the transmitter 50 includes a dense layer of one or more units 52 (e.g. one or more neural networks), a complex vector generator 54 and a normalization module 56. The modules within the transmitter 50 are provided by way of example and modifications are possible.

For example, the complex vector generator 54 and the normalization module 56 could be provided in a different order.

The message index s is fed into a succession of layers, e.g. dense neural network (NN) layers 52 with possible different non-linear activation functions (such as ReLU, tanh, sigmoid, linear etc.). The final layer of the neural network has 2N output dimensions and a linear activation function. If no dense layer is used, $n_{emb}=2n$.

The output of the dense layers 52 is converted to a complex-valued vector (by complex vector generator 54) through the mapping $\mathbb{R}2\mathbb{C}:\mathbb{R}^{2N}\mapsto\mathbb{C}^N$, which could be implemented as $\mathbb{R}2\mathbb{C}(z)=z_0^{N-1}+jz_N^{2N-1}$.

A normalization is applied by the normalization module 56 that ensures that power, amplitude or other constraints are met. The result of the normalization process is the transmit vector x of the transmitter 50 (where $x \in \mathbb{C}^N$). As noted above, the order of the complex vector generation and the normalization could be reversed.

Figure 4:
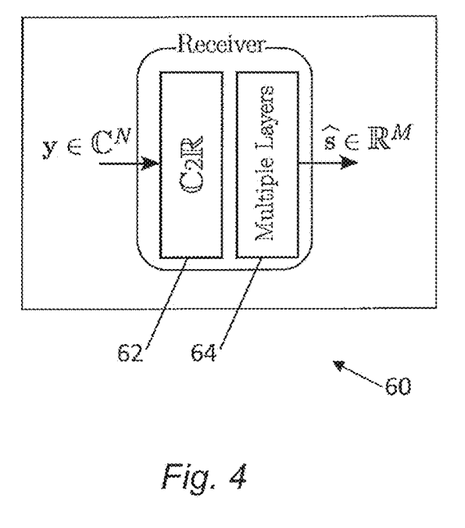
FIG. 4 is a block diagram of a receiver used in example embodiments.

FIG. 4 is a block diagram of a receiver, indicated generally by the reference numeral 60, used in example embodiments (such as the receivers 20 and 22).

As shown in FIG. 4, the receiver 60 includes a real vector generator 62 and one or more layers 64 (e.g. one or more neural networks). The modules within the receiver 60 are provided by way of example and modifications are possible.

The received vector $y \in \mathbb{C}^N$ is transformed (by real vector generator 62) into a real-valued vector of 2N dimensions through the mapping $\mathbb{C}2\mathbb{R}:\mathbb{C}^N\mapsto\mathbb{R}^{2N}$, which could be implemented as $\mathbb{C}2\mathbb{R}(z)=[\mathcal{R}\{z\}^T, \mathcal{I}\{z\}^T]^T$.

The result is fed into the one or more layers 64, which layers may have different activation functions such as ReLU, tanh, sigmoid, linear, etc. The last layer has M output dimensions. This generates a M-dimension real-valued vector $\hat{s} \in \mathbb{R}^M$, which can be interpreted as a guess of s. It is also possible to use complex-valued neutral networks to avoid the mapping $\mathbb{R}2\mathbb{C}$.

In other words, the receiver 60 maps an N-dimensional complex-valued vector to an M-real-valued vector.

Training of a communication system in accordance with the principles described herein can be considered to consist of two separate phases, one for the receivers of the transmission system and one for the transmitters of the transmission system. Thus, for example, the operations 32 and 34 of the algorithm 30 can be considered to be a first phase and the operations 36 and 38 of the algorithm 30 can be considered to be a second phase.

Figure 5:
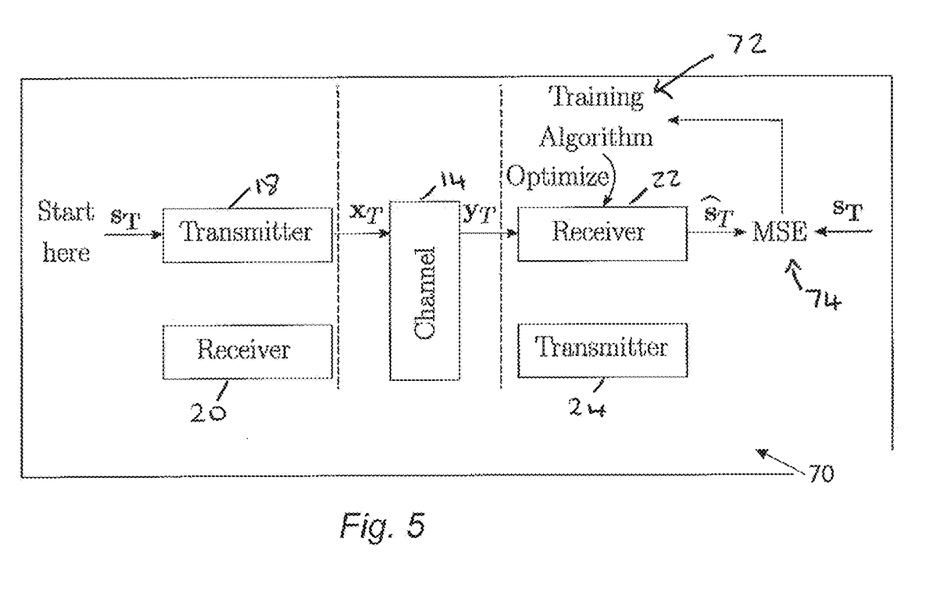
FIG. 5 is a block diagram of an example communication system in accordance with an example embodiment.

FIG. 5 is a block diagram of an example communication system, indicated generally by the reference numeral 70, illustrating a receiver training algorithm in accordance with an example embodiment. The system 70 demonstrates aspects of the receiver-training operations described above with reference to the operations 32 and 34 (i.e. the 'first phase' described above).

The system 70 includes the first transmitter 18 and the first receiver 20 of the first module 12 described above, the second receiver 22 and the second transmitter 24 of the second module 16 described above, and the channel 14 described above. The system 70 additionally comprises a training algorithm, indicated generally by the reference numeral 72, and a loss function generation module, indicated generally by the reference numeral 74.

In the explanation below, the two modules (or agents) that are aiming to learn to communicate (such as the modules 12 and 16 described above) are denoted by A and B, a∈{A,B} denotes one of the two agents, and $\bar{a}$ is the other agent, such that:

$$\bar{a} = \begin{cases} A, & \text{if } a = B \\ B, & \text{if } a = A \end{cases}$$

For both agents a∈{A,B}, the transmitter of $\bar{a}$ (the first transmitter 18 in the example system 70) send a sequence of known real-valued vectors to the receiver of a (the receiver 22 of the system 70). The neural network of the receiver 22 is optimised (using training algorithm 72) based on stochastic gradient descent and reinforcement learning. The goal of the optimisation is to reduce the mean square error, defined in module 74 as:

$$MSE = \frac{1}{N_R} \sum_{i=1}^{N_R} \|s_{T,i} - \hat{s}_{T,i}\|_2^2$$

Where:
$N_R$ is the number of real-value training examples used;
$s_T$ is the symbol transmitted; and
$\hat{s}_T$ is the symbol received.

Figure 6:
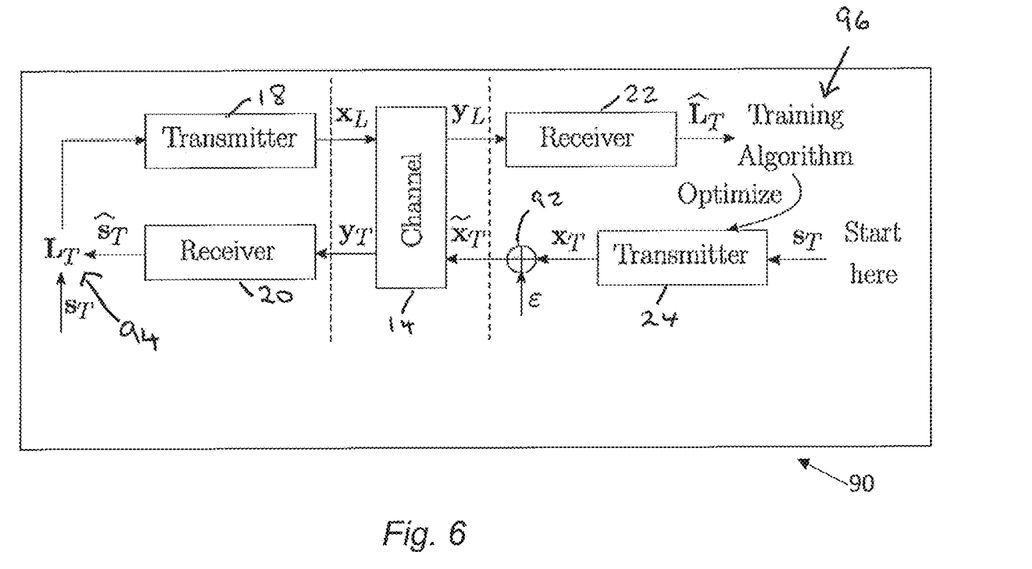
FIG. 6 is a block diagram of an example communication system in accordance with an example embodiment.

FIG. 6 is a block diagram of an example communication system, indicated generally by is the reference numeral 90, illustrating a transmitter training algorithm in accordance with an example embodiment. The system 90 demonstrates aspects of the transmitter training operations described above with reference to the operations 36 and 38 (i.e. the 'second phase' described above).

The system 90 includes the first transmitter 18 and the first receiver 20 of the first module 12 described above, the second receiver 22 and the second transmitter 24 of the second module 16 described above, and the channel 14 described above. The system 90 additionally comprises a perturbation module 92 between the second transmitter 24 and the channel 14, a loss function generation module, indicated generally by the reference numeral 94 and a training algorithm, indicated generally by the reference numeral 96.

To continue the example above, for both agents a∈{A,B}, the transmitter of a (the second transmitter 24 of the system 90) sends a sequence of known real-valued vectors to the receiver 20. However, the transmitter signals associated with each vector are slightly perturbed by perturbation module 92 by adding random vectors c taken from a known distribution (e.g. zero mean Gaussian perturbations).

The loss function generation module 94 computes a loss function based on the squared error for each received vector. No optimisation of the receiver 20 is carried out at this step.

The agent a uses the first transmitter 18 to feedback the squared errors generated in loss function generation module 94 to the agent a, which agent receives the data through the second receiver 22 (from the channel 14).

The agent a optimises the neural network of the second transmitter 24 by estimating the gradient of the loss with respect to its trainable parameters using the knowledge of the transmitted vectors and signals, as well as the distribution of the perturbations applied by the perturbation module 92.

Figure 7:
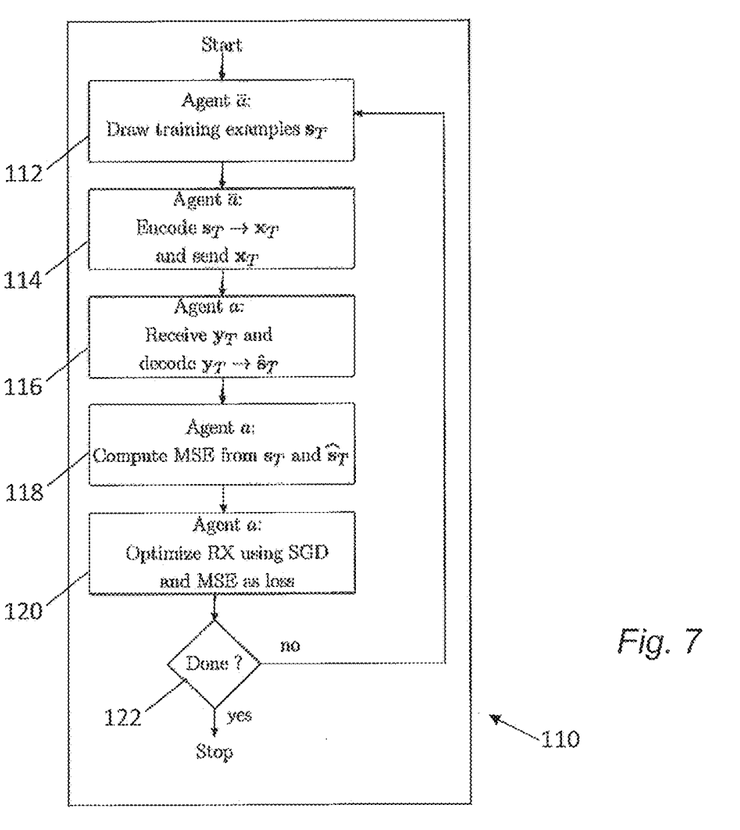
FIG. 7 is a flow chart showing an algorithm in accordance with an example embodiment.

FIG. 7 is a flow chart showing an algorithm, indicated generally by the reference numeral 110, in accordance with an example embodiment, that provides further details of the receiver-training algorithm described above.

The algorithm no starts at operation 112, the agent $\bar{a}$ draws up a random set of $N_R$ real-vectored vectors $S_T = \{s_{T,i}, i=1, \ldots, N_R\}$ independently from some distribution on a subset of $\mathbb{R}^M$.

At operation 114, the agent $\bar{a}$ computes the corresponding output vectors $x_{T,i} = TX(s_{T,i})$. The output vectors are transmitted over the channel 14 by transmitter 18.

At operation 116, the agent a receives the transmitted vectors (now denoted $y_{T,i}$, i=1, ..., $N_R$) at receiver 22 and computes the symbols $\hat{s}_{T,i} = RX(y_{T,i}, i=1, \ldots, N_R)$.

At operation 118, the agent a computes the mean square error (using module 74) from $s_T$ and $\hat{s}_T$.

At operation 120, the agent a using the training algorithm 72 to optimise the receiver 22 by applying one step of a stochastic gradient describes to the trainable parameters of the receiver, using mean square error (MSE) as the loss function, where (as noted above):

$$MSE = \frac{1}{N_R} \sum_{i=1}^{N_R} \|s_{T,i} - \hat{s}_{T,i}\|_2^2$$

Finally, at operation 122, it is determined whether the algorithm no is complete. If so, the algorithm terminates; otherwise, the algorithm returns to operation 112 and the operations 112 to 122 are repeated.

The receiver of the agent a (the receiver 22 in the example above) should know the set of transmitted messages $s_T$ non-causally. This can be achieved in many ways. For example, both agents may use the same random number generator initialised with the same seed. Alternatively, both agents could agree prior to training on the sets of $s_T$ which are to be used in each training iteration.

The batch size $N_R$ as well as the learning rate (and possible other parameters of the chosen stochastic gradient descent variant e.g. ADAM, RMSProp, Momentum) could be optimization parameters of the training operation.

The operation 122 of the algorithm no may take many forms. These include stopping after a fixed number of training iterations, stopping when the mean square error has not decreased during a fixed number of iteration or stopping when the mean square error has reached a desired value.

Figure 8:
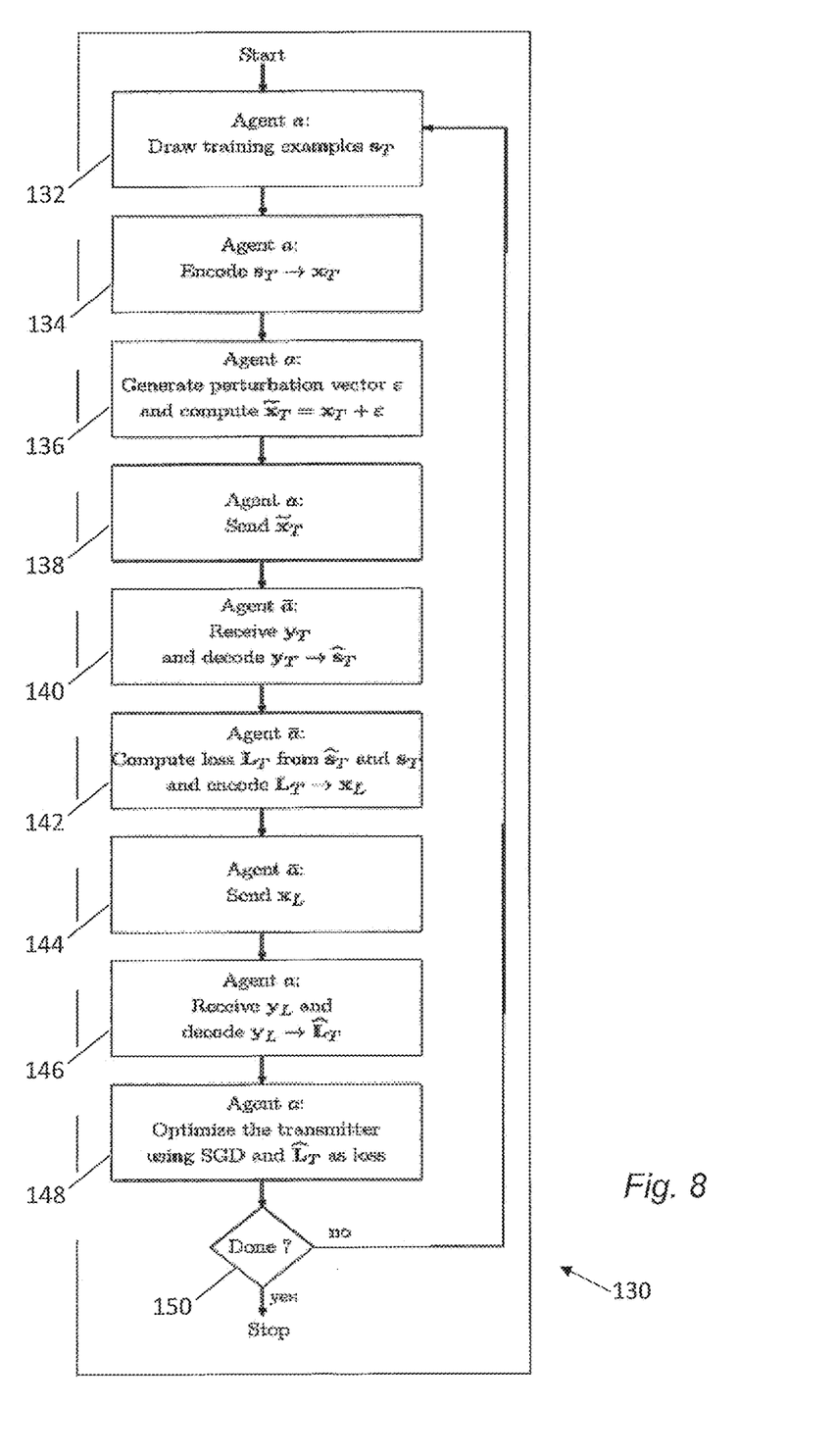
FIG. 8 is a flow chart showing an algorithm in accordance with an example embodiment.

FIG. 8 is a flow chart showing an algorithm, indicated generally by the reference numeral 130, in accordance with an example embodiment, that provides further details of the transmitter-training algorithm described above.

The algorithm 130 starts at operation 132, where the agent a draws up a random set of $N_T$ real-vectored vectors $S_T = \{s_{T,i}, i=1, \ldots, N_T\}$ independently from some distribution on a subset of $\mathbb{R}^M$.

At operation 134, the agent a computes the corresponding output vectors $x_{T,i} = TX(s_{T,i})$. The output vectors are output by the transmitter 24 to the perturbation module 92.

At operation 136, the agent a draws $N_T$ perturbation vectors $\varepsilon_i \in \mathbb{C}^N$, i=1, ..., $N_T$ independent from and according to some distribution $p(\varepsilon)$. For example, $p(\varepsilon)$ could be the multivariate complex Gaussian distribution $\mathcal{CN}(0, \sigma^2 I_N)$ with some small variance $\sigma^2$.

On the basis of the perturbation vectors $\varepsilon_i$, the perturbation module 92 generates perturbed vectors $\tilde{x}_{T,i} = x_{T,i} + \varepsilon_i$.

At operation 138, agent a transmits the perturbed vectors to the agent a over the channel 14 to the first receiver 20.

Denote $p(\tilde{x}_{T,i}|x_{T,i})$ the resulting conditional pdf of $\tilde{x}_{T,i}$ for a given $x_{T,i}$. The first receiver 20 receives the outputs $y_{T,i}$, i=1, ..., $N_T$.

At operation 140, the agent $\bar{a}$ receives the transmitted vectors $y_{T,i}$ at the receiver 22 and is computes the symbols $\hat{s}_T$=RX($y_{T,i}$i=1, ..., $N_T$).

At operation 142, module 94 of the agent $\bar{a}$ computes the mean square error $L_T$, as follows:

$$L_{T,i} = \|s_{T,i} - \hat{s}_{T,i}\|_2^2$$

The mean square error is encoded as $x_L$ for transmission using the first transmitter 18.

The encoded error function is transmitter from the transmitter 18 to the second receiver 22 in operation 144 and received and decoded at the receiver 22 in operation 146.

At operation 148, the agent a uses the training algorithm 96 to optimise the second transmitter 24 by applying one step of a stochastic gradient describes to the trainable parameters of the transmitter, using mean square error (MSE) as the loss function, where:

$$\hat{L}_T = \frac{1}{N_T} \sum_{i=1}^{N_T} \hat{L}_{T,i} \log p(\tilde{x}_{T,i}|s_{T,i})$$

Note that the loss function is a function of which the gradient with respect to the trainable parameters θ of the transmitter are computed. The function $\nabla_\theta L_T$ is also known as the policy gradient.

Finally, at operation 150, it is determined whether the algorithm 130 is complete. If so, the algorithm terminates; otherwise, the algorithm returns to operation 132 and the operations 132 to 150 are repeated.

The receiver of the agent $\bar{a}$ (the receiver 20 in the example above) should know the set of transmitted messages $s_T$ non-causally. This can be achieved in many ways. For example, both agents may use the same random number generator initialised with the same seed. Alternatively, both agents could agree prior to training on the sets of $s_T$ which are to be used in each training iteration.

The batch size $N_T$ as well as the learning rate (and possible other parameters of the chosen stochastic gradient descent variant e.g. ADAM, RMSProp, Momentum) could be optimization parameters of the training operation.

The operation 150 of the algorithm 130 may take many forms. These include stopping after a fixed number of training iterations, stopping when the mean square error has not decreased during a fixed number of iteration or stopping when the mean square error has reached a desired value.

The training processes described herein encompass a number of variants. The use of reinforcement learning as described herein relies on exploring the policy space (i.e. the space of possible state to action mappings). As described herein, the policy is the mapping implemented by the transmitter, the state space is the source symbol alphabet and the action space is $\mathbb{C}^n$. Exploring can be done in numerous ways, two of the most popular approaches being:

Gaussian policy, in which a perturbation vector c is drawn from a multivariate zero-mean normal distribution and added to the current policy. This ensures exploration "in the neighbourhood" of the current policy.

ε-greedy, in which with probability 1-ε, the token action is the one of the policy, and with probability c a random action is taken.

The covariance matrix of the normal distribution from which the perturbation vector c is drawn in the Gaussian policy, and the c parameter of the c-greedy approach, are usually fixed parameters, i.e., not learned during training. These parameters control the "amount of exploration", as making these parameters smaller reduces the amount of random exploration, and favours actions from the current policy.

Figure 9:
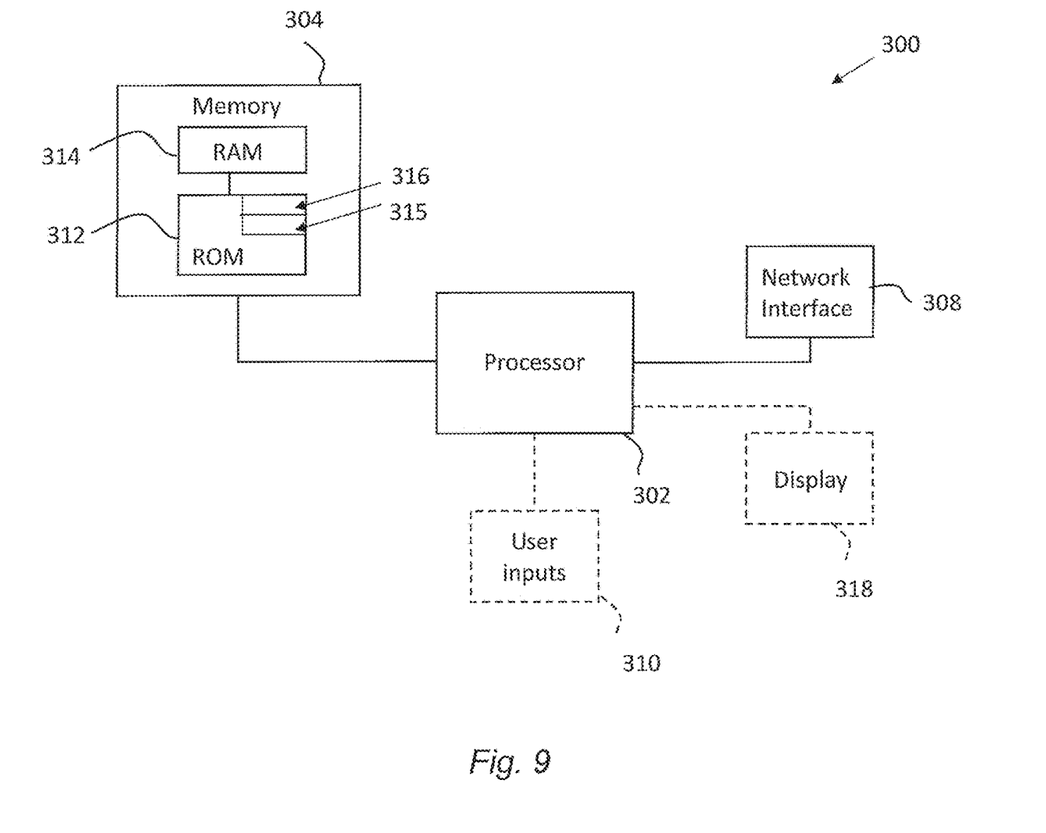
FIG. 9 is a block diagram of components of a system in accordance with an exemplary embodiment.

For completeness, FIG. 9 is a schematic diagram of components of one or more of the example embodiments described previously, which hereafter are referred to generically as processing systems 300. A processing system 300 may have a processor 302, a memory 304 closely coupled to the processor and comprised of a RAM 314 and ROM 312, and, optionally, user input 310 and a display 318. The processing system 300 may comprise one or more network/apparatus interfaces 308 for connection to a network/apparatus, e.g. a modem which may be wired or wireless. Interface 308 may also operate as a connection to other apparatus such as device/apparatus which is not network side apparatus. Thus direct connection between devices/apparatus without network participation is possible.

The processor 302 is connected to each of the other components in order to control operation thereof.

The memory 304 may comprise a non-volatile memory, such as a hard disk drive (HDD) or a solid state drive (SSD). The ROM 312 of the memory 314 stores, amongst other things, an operating system 315 and may store software applications 316. The RAM 314 of the memory 304 is used by the processor 302 for the temporary storage of data. The operating system 315 may contain code which, when executed by the processor implements aspects of the algorithms 30, 110 or 130 described above. Note that in the case of small device/apparatus the memory can be most suitable for small size usage i.e. not always hard disk drive (HDD) or solid state drive (SSD) is used.

The processor 302 may take any suitable form. For instance, it may be a microcontroller, a plurality of microcontrollers, a processor, or a plurality of processors.

The processing system 300 may be a standalone computer, a server, a console, or a network thereof. The processing system 300 and needed structural parts may be all inside device/apparatus such as IoT device/apparatus i.e. embedded to very small size In some example embodiments, the processing system 300 may also be associated with external software applications. These may be applications stored on a remote server device/apparatus and may run partly or exclusively on the remote server device/apparatus. These applications may be termed cloud-hosted applications. The processing system 300 may be in communication with the remote server device/apparatus in order to utilize the software application stored there.

Figure 10A:
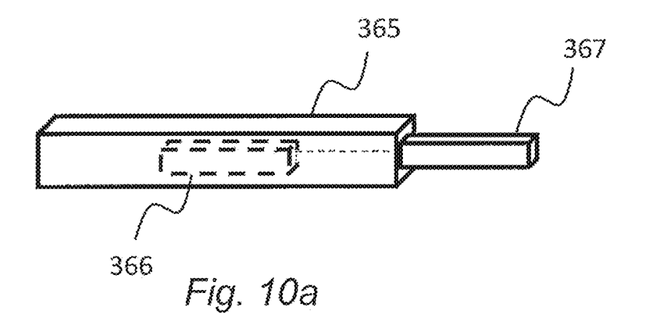
FIGS. 10a and 10b show tangible media, respectively a removable non-volatile memory unit and a compact disc (CD) storing computer-readable code which when run by a computer perform operations according to embodiments.
Figure 10B:
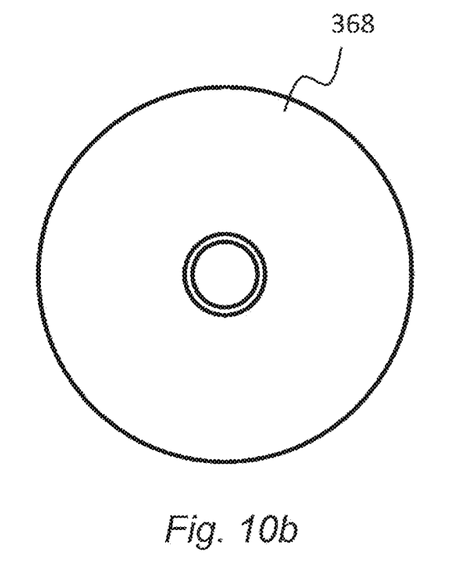

FIGS. 10a and 10b show tangible media, respectively a removable non-volatile memory unit 365 and a compact disc (CD) 368, storing computer-readable code which when run by a computer may perform methods according to example embodiments described above. The removable memory unit 365 may be a memory stick, e.g. a USB memory stick, having internal memory 366 storing the computer-readable code. The memory 366 may be accessed by a computer system via a connector 367. The CD 368 may be a CD-ROM or a DVD or similar. Other forms of tangible storage media may be used. Tangible media can be any device/apparatus capable of storing data/information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

As used in this application, the term "circuitry" refers to all of the following: (a) hardware-only circuit implementations (such as implementations in only analogue and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a server, to perform various functions) and (c) to circuits, such as a microprocessor(s) or a portion of a microprocessor(s), that require software or firmware for operation, even if the software or firmware is not physically present.

If desired, the different functions discussed herein may be performed in a different order and/or concurrently with each other. Furthermore, if desired, one or more of the above-described functions may be optional or may be combined. Similarly, it will also be appreciated that the flow diagrams of FIGS. 2, 7 and 8 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus comprising:
at least one processor; and
at least one memory including computer program code;
the at least one memory and the computer program code configured to, with the at least one processor, cause the apparatus at least to perform,
receiving a first receiver-training sequence of messages at a first receiver of a first module of a transmission system from a second transmitter over a channel, wherein the transmission system comprises the first module having a first transmitter and the first receiver, a second module having the second transmitter and a second receiver, and the channel, wherein the first transmitter includes a first transmitter algorithm having at least some trainable weights, the second transmitter includes a second transmitter algorithm having at least some trainable weights, the first receiver has a first receiver algorithm having at least some trainable weights, and the second receiver includes a second receiver algorithm having at least some trainable weights;
obtaining or generating a first receiver loss function, the first receiver loss function being generated based on the first receiver-training sequence as received at the first receiver and knowledge of the first receiver-training sequence as transmitted by the second transmitter;
training at least some weights of the first receiver training algorithm based on the first receiver loss function;
transmitting a second receiver-training sequence of messages from the first transmitter to the second receiver over the channel to enable at least some weights of the second receiver algorithm to be trained on the basis of a second receiver loss function generated based on the second receiver-training sequence as received at the second receiver and knowledge of the second receiver-training sequence as transmitted by the first transmitter;
transmitting a perturbed version of a first transmitter-training sequence of messages from the first transmitter to the second receiver over the channel;
receiving a first transmitter loss function at the first receiver as sent from the second transmitter over the channel, wherein the first transmitter loss function is based on the transmitted perturbed versions of the first transmitter-training sequence of messages as received at the second receiver and knowledge of the first transmitter-training sequence of messages; and
training at least some weights of the transmitter algorithm of the first transmitter based on the first transmitter loss function.

2. An apparatus as claimed in claim 1, wherein the at least one memory and the computer program code are configured to, with the at least one processor, cause the apparatus at least to perform generating the perturbed version of the first transmitter-training sequence of messages at the first module of the transmission system.

3. An apparatus as claimed in claim 1, wherein the perturbations are zero-mean Gaussian perturbations.

4. An apparatus as claimed in claim 1, wherein the first transmitter loss function is generated at the second module.

5. An apparatus as claimed in claim 1, wherein the first transmitter loss function is based on a mean-squared error between the first transmitter-training sequence of messages and the perturbed version of the first transmitter-training sequence of messages.

6. An apparatus as claimed in claim 1, wherein the at least one memory and the computer program code are configured to, with the at least one processor, cause the apparatus at least to perform repeating the training of the at least some weights of the first transmitter algorithm of the first transmitter until a first condition is reached.

7. An apparatus as claimed in claim 6, wherein the first condition is a defined number of iterations and/or a defined performance level.

8. An apparatus as claimed in claim 1, wherein the training at least some weights of the first transmitter further comprises optimising one or more of a batch size of the first transmitter-training sequence of messages, a learning rate, and a distribution of the perturbations applied to the perturbed versions of the first transmitter-training sequence of messages.

9. An apparatus as claimed in claim 1, wherein the at least one memory and the computer program code are configured to, with the at least one processor, cause the apparatus at least to perform repeating the training of the at least some weights of the first receiver algorithm until a second condition is reached.

10. An apparatus as claimed in claim 9, wherein the second condition is a defined number of iterations and/or a defined performance level.

11. An apparatus as claimed in claim 1, wherein the first receiver loss function is based on a mean-squared error between the first receiver-training sequence of messages as transmitted by the second transmitter and the first receiver-training sequence of messages as received at the first receiver.

12. An apparatus as claimed in claim 1, wherein the at least one memory and the computer program code are configured to, with the at least one processor, cause the apparatus at least to perform repeating both the training of the at least some weights of the first transmitter algorithm and repeating the training of the at least some weights of the first receiver algorithm until a third condition is reached.

13. An apparatus as claimed in claim 1, wherein the first receiver algorithm comprises a receiver neural network.

14. An apparatus as claimed in claim 1, wherein the first transmitter algorithm comprises a transmitter neural network.

15. An apparatus as claimed in claim 1, wherein the at least one memory and the computer program code are configured to, with the at least one processor, cause the apparatus at least to perform,
receiving a perturbed version of a second transmitter-training sequence of messages for the second transmitter at the first receiver; and
generating a second loss function, wherein the second loss function is based on the received perturbed version of the second transmitter-training sequence of messages as received at the first receiver and knowledge of the second transmitter-training sequence of messages for the second transmitter of the transmission system.

16. An apparatus as claimed in claim 15, wherein the at least one memory and the computer program code are configured to, with the at least one processor, cause the apparatus at least to perform sending the second loss function from the first transmitter to the second receiver.

17. An apparatus as claimed in claim 15, wherein the at least one memory and the computer program code are configured to, with the at least one processor, cause the apparatus at least to perform,
receiving the perturbed version of the first transmitter-training sequence of messages for the first transmitter at the second receiver;
generating the first transmitter loss function; and
sending the first transmitter loss function from the second transmitter to the first receiver.

18. A method comprising:
receiving a first receiver-training sequence of messages at a first receiver of a first module of a transmission system from a second transmitter over a channel, wherein the transmission system comprises the first module having a first transmitter and the first receiver, a second module having the second transmitter and a second receiver, and the channel, wherein the first transmitter includes a first transmitter algorithm having at least some trainable weights, the second transmitter includes a second transmitter algorithm having at least some trainable weights, the first receiver has a first receiver algorithm having at least some trainable weights, and the second receiver includes a second receiver algorithm having at least some trainable weights;
obtaining or generating a first receiver loss function, the first receiver loss function being generated based on the first receiver-training sequence as received at the first receiver and knowledge of the first receiver-training sequence as transmitted by the second transmitter;
training at least some weights of the first receiver training algorithm based on the first receiver loss function;
transmitting a second receiver-training sequence of messages from the first transmitter to the second receiver over the channel to enable at least some weights of the second receiver algorithm to be trained on the basis of a second receiver loss function generated based on the second receiver-training sequence as received at the second receiver and knowledge of the second receiver-training sequence as transmitted by the first transmitter;
transmitting a perturbed version of a first transmitter-training sequence of messages from the first transmitter to the second receiver over the channel;
receiving a first transmitter loss function at the first receiver as sent from the second transmitter over the channel, wherein the first transmitter loss function is based on the transmitted perturbed versions of the first transmitter-training sequence of messages as received at the second receiver and knowledge of the first transmitter-training sequence of messages; and
training at least some weights of the transmitter algorithm of the first transmitter based on the first transmitter loss function.

19. A non-transitory computer readable medium storing a computer program comprising instructions, which when executed by a processor, cause an apparatus including the processor to perform the following:
receive a first receiver-training sequence of messages at a first receiver of a first module of a transmission system from a second transmitter over a channel, wherein the transmission system comprises the first module having a first transmitter and the first receiver, a second module having the second transmitter and a second receiver, and the channel, wherein the first transmitter includes a first transmitter algorithm having at least some trainable weights, the second transmitter includes a second transmitter algorithm having at least some trainable weights, the first receiver has a first receiver algorithm having at least some trainable weights, and the second receiver includes a second receiver algorithm having at least some trainable weights;

obtain or generate a first receiver loss function, the first receiver loss function being generated based on the first receiver-training sequence as received at the first receiver and knowledge of the first receiver-training sequence as transmitted by the second transmitter;

train at least some weights of the first receiver training algorithm based on the first receiver loss function;

transmit a second receiver-training sequence of messages from the first transmitter to the second receiver over the channel to enable at least some weights of the second receiver algorithm to be trained on the basis of a second receiver loss function generated based on the second receiver-training sequence as received at the second receiver and knowledge of the second receiver-training sequence as transmitted by the first transmitter;

transmit a perturbed version of a first transmitter-training sequence of messages from the first transmitter to the second receiver over the channel;

receive a first transmitter loss function at the first receiver as sent from the second transmitter over the channel, wherein the first transmitter loss function is based on the transmitted perturbed versions of the first transmitter-training sequence of messages as received at the second receiver and knowledge of the first transmitter-training sequence of messages; and train at least some weights of the transmitter algorithm of the first transmitter based on the first transmitter loss function.

\* \* \* \* \*